March 19, 1935.  A. G. WINTERS  1,994,497
INDICATOR
Filed June 27, 1932   2 Sheets-Sheet 2
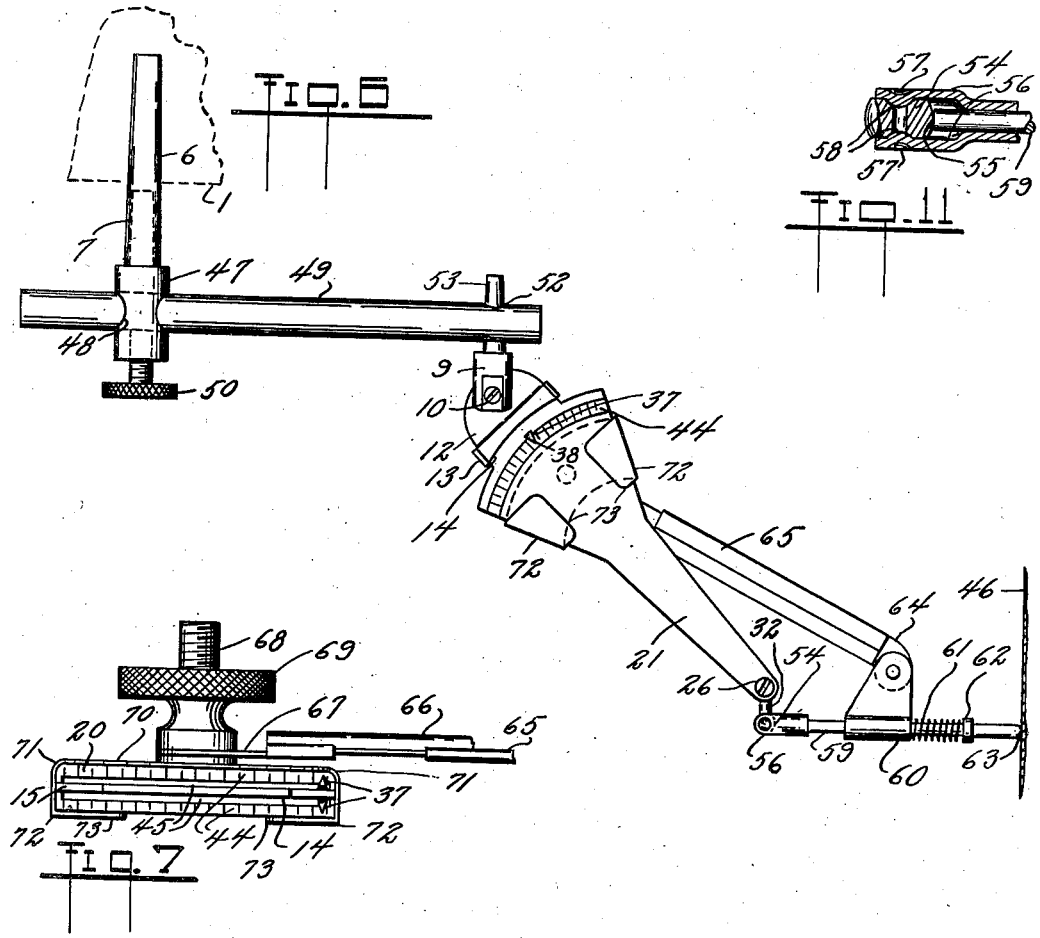
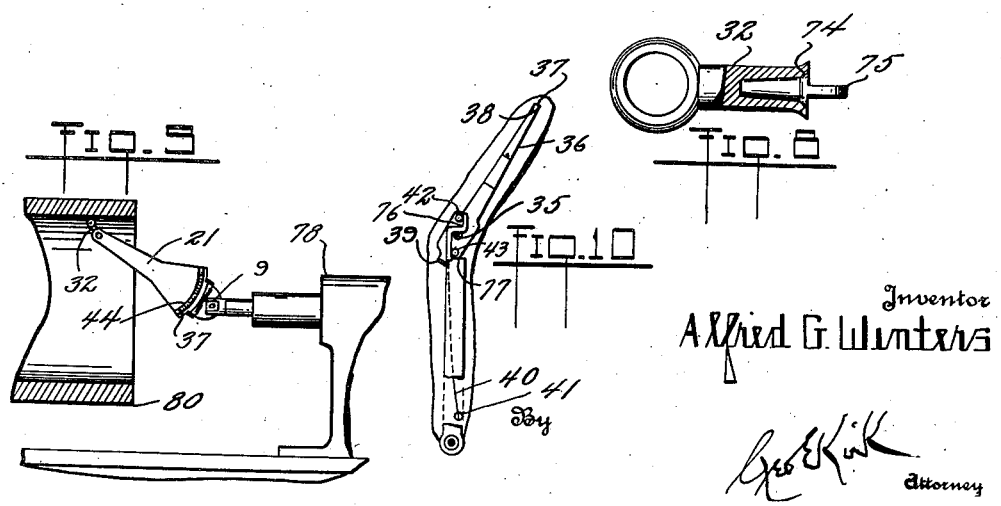
Inventor
Alfred G. Winters
By
Attorney Patented Mar. 19, 1935

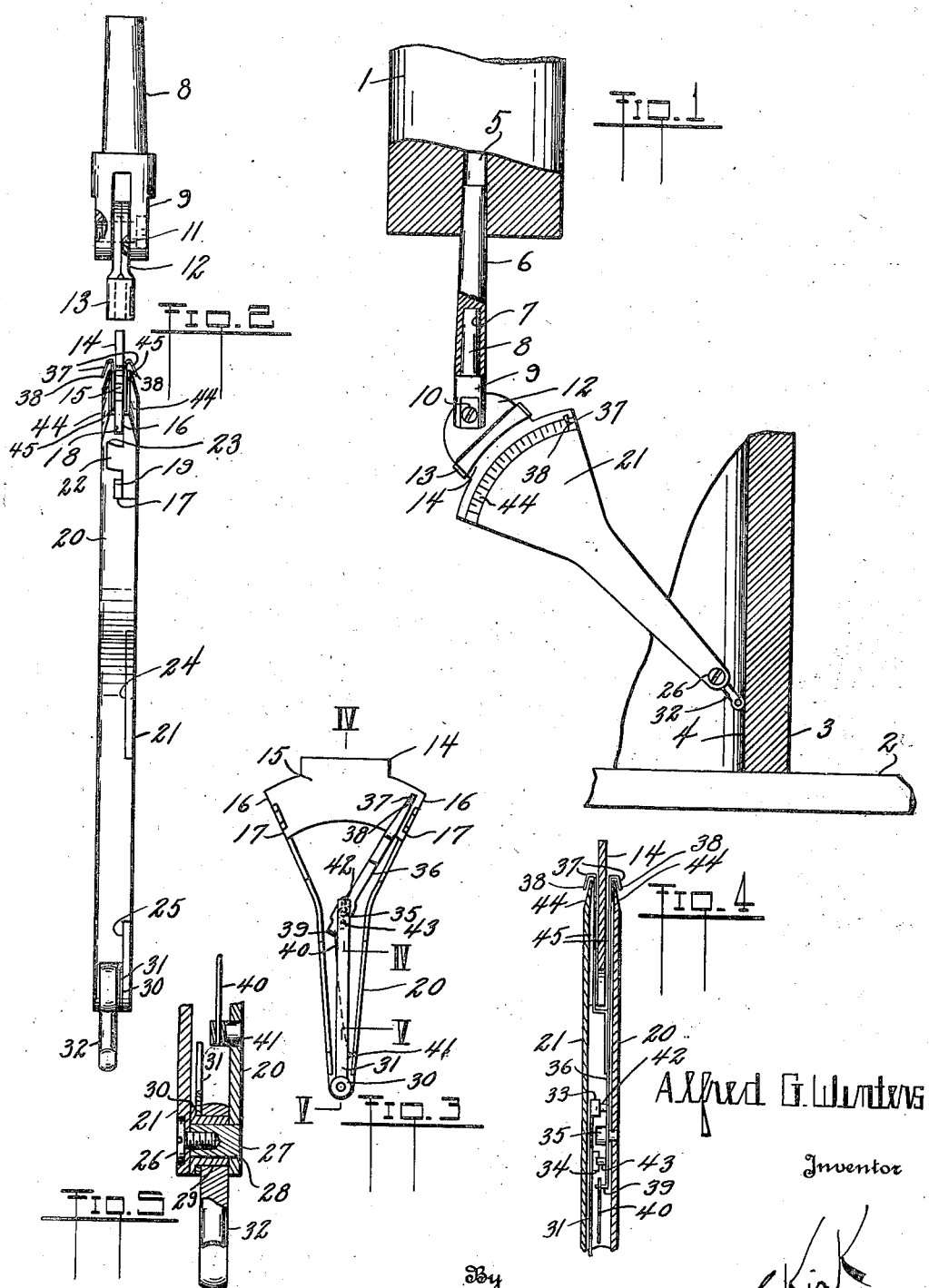

1,994,497

UNITED STATES PATENT OFFICE 1,994,497

INDICATOR

Alfred G. Winters, Toledo, Ohio

Application June 27, 1932, Serial No. 619,562

11 Claims. (Cl. 33—172)

This invention relates to distance or dimension testing, and surface testing.

This invention has utility especially for locating and checking variations, as for positioning work coaxially for a succeeding operation, as in planers, shapers, milling, and other machines.

Referring to the drawings:

Fig. 1 is a fragmentary showing of an embodiment of the invention between a drill press spindle and a work table for such press;

Fig. 2 is a side elevation of the device of Fig. 1 in spread position;

Fig. 3 is a view of the housing with the lid and contact arm removed;

Fig. 4 is a section on the line IV—IV, Fig. 3;

Fig. 5 is a section on the line V—V, Fig. 3;

Fig. 6 is an assembly of the device of Fig. 1 for extension for increased dimensional checking;

Fig. 7 is a view of the strut or auxiliary bracket assembly with the device of Fig. 6;

Fig. 8 is a detail view of a contact attachment;

Fig. 9 shows an embodiment of the mounting of Fig. 1, assembled with a lathe instead of a drill press;

Fig. 10 is a fragmentary view of the device showing features of the actuator wherein the transmission lever to the indicator lever operates in the plane of the thrown portions instead of being offset thereto as shown in Fig. 4; and Fig. 11 is an enlarged view of the contact attachment of Fig. 6.

Drill spindle 1 is shown in opposed relation to work table 2 upon which may be adjustably positioned article 3 of work, say having cylindrical inner face 4 which it is desired to position as to socket 5 in the spindle 1 in order that a tool operating thereon may be effective concentrically with the surface 4.

To this end, extension 6 may snugly seat in the seat 5. This extension or adapter 6, which may or may not be tapered, is shown as having tapered seat 7 in which may protrude stem 8. This adapter or substitute adapters permit use in wide ranges of size in equipment. This stem 8, therebeyond has fork terminus 9, which may have adjusting screw 10 as a pivot for coacting with eye 11 in two-ply cheek 12, so that there is efficient holding in the adjusted position of this cheek 12 relatively to the mounting or terminus 9. This cheek 12 is shown providing a socket 13 which may be thrust for frictional assembly with protruding seat 14 on plate or member 15 having lug portions 16, 17, coacting in seats 18, 19, of main frame or housing 20 shown as of general fan form and provided with lid 21. This lid 21 has tongue 22 entering undercut seat 23 between the seats 18, 19 at each side of the fan free end portion. These seats in their undercut may be such that, by placing the tip of the lid 21 on the plate 15 and moving the narrow portions of the housing toward each other, the tongue 22 may be rocked into interlocking position in the undercut seat 23, toward engagement at lugs 24 of the lid 21 and additional engagement at seat 25. This rocking of the lid 21 on its arc tip at the plate 15 as a fulcrum, at starting, shifts the tongue 22 into the seat 23. This lid adjacent the seat 25 has screw 26 therethrough for anchoring the lid at a position remote from the seat 23.

This screw 26 is in bushing 27 having rivet assembly 28 with the housing 20. Mounted on this pin or bushing 27 is sleeve 29 having flange 30 seated snugly against lever arm 31, with which there is frictional holding or gripping of lever arm 32, in that the bushing 27 provides the fulcrum and that this arm 32 may be a contactor. It is thus clear that the arm 32 may be adjusted to various positions upon its pivot bearing. The lever arm 31, remote from the arm 32, has its free end offset 33 from one side thereof, and, spaced back from such free end, offset 34 from the opposite edge thereof. These offsets 33, 34, are normally on opposite sides of fulcrum 35 for the lever having arm 36 terminating in a pair of pointers 37 having terminally oppositely overhanging portions 38.

The pair of pointers 37 are spaced from each other to embrace the member or plate 15. This levers 36, remote from the pointers, has extension 39 providing a seat to be engaged by spring 40 as a flexing member anchored with pin 41, riveted in the housing 20 adjacent the fulcrum pin 27. This flexing member or spring 40 tends normally to hold the lever 36 with projections 42, 43, in contact respectively with the offsets 33, 34. It is thus clear that as the arm 32 is moved to actuate the lever arm 31, there is effected a rocking of the lever 36 to cause the overhanging portions 38 of the pointers to pass along over beveled region 44 of the housing 20 and the lid 21. The movement of the lever 36 will always be the same under the influence of movement of the arm 32, regardless of the direction of the movement of the lever 31. With the projection 42 a slightly greater distance from the fulcrum 35 than the projection 43, there is compensation for the greater radial distance along the lever 31 from its fulcrum 30.

There is shown clearance 45 on each side of the member 15 for the pointers 37 and the overhangs 38 along the graduations 44 render such visible not only from the flat side of the housing or lid 21, but even looking from the end into or toward the beveled portions 44. It is thus clear that readings may be readily had from different directions in locating the shifting of the pointer.

The arm 32 may be located in the contacting relation with the work face or surface 4, even by shifting the housing 20, 21, as to the forked extension or terminus 9. The swinging of the arm 32 as to the arm 31 may locate the pointer at a terminus or longer scale of graduations 44 and the variations in the contact device position checked, say by slow rotation of the spindle 1. The purpose is that by a position for this indicator, the work 3 may be so located that the indicator pointer 37 may not shift. The delicacy of this tool will be determined by the magnification extent.

As herein shown, with a scale of approximately 1 inch length, this may be a showing of, say 20/1000 of an inch.

Inasmuch as this is a dimension testing tool, the range of its utility is of importance and this range may be not only in its mounting but in its adaptations. For small internal diameter work, the housing may approximate parallelism with the face upon which the arm 32 is operated. Inasmuch as the tool may be a small device but still retain its accuracy for large dimensions, occasion may arise to act upon work 46 of much greater diameter than the work 3.

To this end, from the spindle 1 adapter 6 may receive in its set up tapered stem 8 from fitting 47 having transverse seat 48 therein to receive rod 49 while knurled screw 50 in this fitting 47 may coact as a set screw against rod 49 and hold such rod in adjustable radial position. This rod 49 may have transverse seat 52 to receive tapered stem 53 of the adapter coacting fitting 9.

Supplementally, the housing itself may have an extension in conjunction with or independent of this bar extension 49. In the instance that the bar extension 49 were sufficient, the device would coact as in the showing of Fig. 1. In the instance the bar extension were omitted and the supplemental device used, the connection would be as at the spindle in the Fig. 1 with the extension as shown in Fig. 6. To this end, lever arm 32 has its enlarged terminus 54 shown in section in Fig. 11 to be abutted by seat 55 as a flat end, similar diameter portion of the extension 59 forming a terminus for the extension 59. At this assembly this terminus 54 is engaged by opposing spring fingers 56 fixed with the extension 59. These fingers 56 have beads 57 wedging into the opposing seats or chamfered portions 58. This provides a snug coupling for extension 59 snugly fitting but readily reciprocable as having a sliding fit in bracket 60.

The friction of this bracket 60 is normally overcome by compression spring 61 acting on collar 62, beyond which there is contact terminus or working face 63 of this extension. This spring 61 normally relieves the device of operating tension or resistance from friction so that the tool may be sensitive in response to the contact face 63 as acting upon the work 46. In order to maintain location for this bracket 60 relatively to the housing 20, 21, there is shown member 64 having coacting rib seat fitting 65 with member 66 and thus providing a telescopic or adjustable frictional link to eye 67 about threaded stem 68, where clamping may be effected by knurled nut 69. This stem 68 is fixed with auxiliary bracket plate 70 having rounded seat portion 71 coacting with the corners of the housing 20 at its flare region and less rounded corners 72 coacting with the edges of the region 21 at the flare portions. Overhanging portions of the extension 73 of this attachable fitting for the housing serve to position such as a neat assembly with the indications visible. In fact, they are no more obscured by this device than by the attachment at the plate 15. Furthermore, this bracket, instead of being a guide for the extension rod 59, may serve as a mounting for the housing in lieu of the mounting at plate 15.

Upon occasion, the link 32 may be provided with seat 74 for replaceable contactor 75 of a dimension for reaching into locations in special work. In fact, this may be a substitute contactor terminus for the particular type of contactor used.

Instead of the lever 31 being provided with offsets 33, 34, and thereby having its coaction with the pointer lever 36 from the lever 31, the contacting may be in the plane of the lever 31 by having the lever 31 provided with terminal cutaway portion as seat 76 (Fig. 10) for the projection 42 in providing a seat for the projection 43.

In the instance wherein the work is rotary and the tool to be stationary as in a lathe or planing machine, the device may be assembled as to fixture 78 and act upon work 80 (Fig. 9).

The indicator may also be held by screw clamp and nut 68, 69, 70, to do this same work from a tool post, or to be held as by a height gauge or other instrument or machine.

What is claimed and it is desired to secure by Letters Patent is:

1. A measuring instrument comprising a main frame, an extension of plate form anchored in the frame, an indicator mounted by the frame including a pointer bent back on the main frame away from the extension, and graduations relatively to and over which the bent back portion of the pointer is movable, a throw-multiplying actuator for the indicator embodying said pointer as a first lever having a fulcrum, a second lever having a relatively remote fulcrum, said second lever extending past the fulcrum of the first lever, there being offsets from each lever toward the other forming coacting seats on opposite sides of said fulcrum of the first lever out of the plane of each lever and between the planes of said levers, said main frame widening between the fulcra to house the second lever in one angular range and having definite increase in the relative widening toward the extension from the adjacent fulcrum for housing the first lever in an increased angular range.

2. A measuring instrument embodying a main frame, an indicator mounted thereby including a pointer and graduations relatively to which the pointer is movable, a lever in said frame for acting on said pointer, an arm frictionally connected to the lever remote from the pointer for movement with the lever, said arm having a seat exterior of the frame, and a reciprocable contactor demountably engaging said seat.

3. A measuring instrument embodying a main frame, an indicator mounted thereby including a pointer and graduations relatively to which the pointer is movable, a lever in said frame for acting on said pointer, an arm frictionally connected to the lever remote from the pointer for movement with the lever, said arm having a seat exterior of the frame, a reciprocable contactor extension from said seat, and a guide from the frame for the extension.

4. A measuring instrument embodying a main frame, an indicator mounted thereby including a pointer and graduations relatively to which the pointer is movable, a lever in said frame for acting on said pointer, an arm frictionally connected to the lever for movement therewith, said arm having a seat, a reciprocable contactor extension from said seat, and an adjustable telescopic guide from the frame for the extension.

5. A measuring instrument comprising a main frame, an indicator mounted thereby including a pointer and graduations relatively to which the pointer is movable, said frame embodying a housing having undercut seat means adjacent the pointer, and a detachable lid having means interlocking with said seat means, said interlocking means comprising a tongue complementary to said seat means.

6. An indicator embodying a twin pointer, a housing for the pointer having undercut seat means, a lid having means rockable into interlocking position with said seat means, said interlocking means comprising a tongue complementary to said seat means.

7. In an instrument comprising a main frame provided with graduations, a pair of pointers and an arm, the combination of an adapter mounting protruding from the main frame between the pair of pointers, the indicating portions of the pointers overhanging the graduations as located on opposite sides of the main frame and spaced by the mounting, cooperating connecting means between the arm and pointers, a reciprocable contactor, a spring normally urging the contactor in one direction, main frame embracing means, and a guide for the contactor connected to said embracing means, said guide cooperating with said spring.

8. In an instrument comprising a main frame provided with graduations, a pair of pointers and an arm, the combination of an adapter mounting protruding from the main frame between the pair of pointers, the indicating portions of the pointers overhanging the graduations as located on opposite sides of the main frame and spaced by the mounting, cooperating connecting means between the arm and pointers, a reciprocable contactor, a spring normally urging the contactor in one direction, main frame embracing means, a guide for the contactor connected to said embracing means, said guide cooperating with said spring, and extensible elements between the embracing means and guide.

9. In a measuring instrument comprising a main frame provided with graduations, an arm and a pair of pointers remote from the arm, the combination of an adapter mounting protruding from the main frame between the pointers and graduations, cooperating connecting means in the main frame between the arm and pointers, a reciprocable contactor connected to operate the arm, a guide for the contactor, and a mounting for the guide having connection to the exterior of the main frame.

10. In a measuring instrument comprising a main frame provided with graduations, an arm and a pair of pointers remote from the arm, the combination of an adapter mounting protruding from the main frame between the pointers and graduations, cooperating connecting means in the main frame between the arm and and pointers, a reciprocable contactor, a detachable hinge connection between the contactor and arm, and a guide for the contactor having adjustable connection to the main frame.

11. In a measuring instrument comprising a main frame provided with graduations, an arm and a pair of pointers remote from the arm, the combination of an adapter mounting protruding from the main frame between the pointers and graduations, and cooperating connecting means in the main frame between the arm and pointers, said mounting including a pair of parallel stems, and a connecting bar therebetween.

ALFRED G. WINTERS.